US008498193B2

United States Patent
Haardt et al.

(10) Patent No.: US 8,498,193 B2
(45) Date of Patent: Jul. 30, 2013

(54) METHOD FOR SELECTION OF AN OPTIMIZED NUMBER OF SUBSCRIBERS IN MOBILE RADIO SYSTEMS

(75) Inventors: Martin Haardt, Plaue (DE); Martin Fuchs-Lautensack, Erbach (DE); Giovanni Del Galdo, Fürth (DE)

(73) Assignee: Cantrele Telecom Co., Limited Liability Company

( * ) Notice: Subject to any disclaimer, the term of this patent is extended or adjusted under 35 U.S.C. 154(b) by 289 days.

(21) Appl. No.: 11/991,735

(22) PCT Filed: Sep. 22, 2006

(86) PCT No.: PCT/EP2006/066649
§ 371 (c)(1),
(2), (4) Date: Nov. 16, 2009

(87) PCT Pub. No.: WO2007/033997
PCT Pub. Date: Mar. 29, 2007

(65) Prior Publication Data
US 2010/0054113 A1 Mar. 4, 2010

(30) Foreign Application Priority Data
Sep. 22, 2005 (DE) .................. 10 2005 046 911

(51) Int. Cl.
*H04J 11/00* (2006.01)

(52) U.S. Cl.
USPC ........................................ 370/203

(58) Field of Classification Search
None
See application file for complete search history.

(56) References Cited

U.S. PATENT DOCUMENTS 6,895,258 B1 * 5/2005 Scherzer et al. ............ 455/562.1
2001/0031647 A1 * 10/2001 Scherzer et al. ............... 455/562

(Continued)

FOREIGN PATENT DOCUMENTS

DE   100 21 862 A1   11/2001
EP   0 926 912 A2    6/1999

(Continued)

OTHER PUBLICATIONS

Martin Fuchs, "A Novel Tree-Based Scheduling Algorithm for the Downlink of Multi-user MIMO Systems with ZF Beamforming." IEEE International Conference on Acoustics, Speech and Signal Processing (ICASSP '05), Mar. 18-23, 2005, vol. 3, pp. III-1121 to III-1124.*

(Continued)

*Primary Examiner* — Chi Pham
*Assistant Examiner* — Mohammad Adhami
(74) *Attorney, Agent, or Firm* — Sterne, Kessler, Goldstein & Fox P.L.L.C.

(57) ABSTRACT

This invention comprises a method of little complexity for selection of an optimized number of subscribers for transmission in wire-free message transmission systems having a plurality of antennas at the base station and having one or more antennas at the receivers, as well as space-division multiple access (SDMA) in conjunction with multiple access in the time domain or frequency domain. Subscribers with channels with little spatial correlation are selected for operation in the same time slot or frequency slot, in order to increase the throughput of the SDMA transmission method, with the relationship between the group size and the mean transmission power being taken into account. The invention interacts both with SDMA methods which do not allow any interference (Zero Forcing) and with methods with residual interference. It is based on a novel interpretation of the ZF principle with the aid of orthogonal projection matrices, which allow the channel quality to be estimated with much less computation complexity, based on use or the transmission method. The possible subscriber combinations are sorted efficiently with the aid of a tree-like search algorithm. The method makes use of perfect channel knowledge or alternatively averaged channel statistics. Quality of service requirements for the subscriber as well as fairness criteria can be taken into account.

21 Claims, 2 Drawing Sheets

U.S. PATENT DOCUMENTS

| | | | | |
|---|---|---|---|---|
| 2002/0105974 | A1* | 8/2002 | Cheng et al. | 370/510 |
| 2003/0128713 | A1* | 7/2003 | Kang | 370/432 |
| 2004/0087343 | A1 | 5/2004 | Lucidarme et al. | |
| 2004/0095907 | A1* | 5/2004 | Agee et al. | 370/334 |
| 2004/0252632 | A1* | 12/2004 | Bourdoux et al. | 370/210 |
| 2005/0147023 | A1 | 7/2005 | Stephens et al. | |
| 2005/0170783 | A1* | 8/2005 | Krishnan et al. | 455/67.11 |
| 2005/0268181 | A1* | 12/2005 | Murty et al. | 714/704 |
| 2006/0120395 | A1* | 6/2006 | Xing et al. | 370/431 |
| 2007/0042715 | A1* | 2/2007 | Salo et al. | 455/63.4 |
| 2008/0037681 | A1* | 2/2008 | Walton et al. | 375/267 |

FOREIGN PATENT DOCUMENTS

| | | |
|---|---|---|
| EP | 1 187 503 A1 | 3/2002 |
| EP | 1 434 452 A1 | 6/2004 |
| EP | 1 505 741 A2 | 2/2005 |
| EP | 1 542 419 A2 | 6/2005 |
| JP | 2002-112328 A | 4/2002 |
| WO | WO 98/30047 A1 | 7/1998 |
| WO | WO 02/33848 A2 | 4/2002 |
| WO | WO 2005/053186 A1 | 6/2005 |
| WO | WO 2005/055507 A1 | 6/2005 |

OTHER PUBLICATIONS

Farhang-Boroujeny "Layering Techniques for space-time communication in multi-user networks" Vehicular Technology Conference, 2003. VTC 2003—Fall. 2003 IEEE 58th Orlando, FL, USA Oct. 6-9, 2003, pp. 1339-1343, vol. 2.*

International Search Report for Application No. PCT/EP2006/066649 Mailed Dec. 29, 2006, 4 pages.

Farhang-Boroujeny B. et al. "Layering Techniques for space-time communication in multi-user networks" Vehicular Technology Conference, 2003. VTC 2003—Fall. 2003 IEEE 58$^{th}$ Orlando, FL, USA Oct. 6-9, 2003, pp. 1339-1343, vol. 2, XP010700858 ISBN: 0-7803-7954-3.

Aste T. et al., "Downlink Beamforming for Cellular Mobile Communications (GSM System)," Annales des Telecommunications -Annals of Telecommunications, Get Lavoisier, Paris, FR, vol. 53, No. 11/12, Nov. 1998, pp. 435-448, SP000804147 ISSN: 0003-4347.

Anxin Li et al., "A novel approach to signal detection in MIMO-OFDM systems combining coding and joint detection techniques" Emerging Technologies: Frontiers of Mobile and Wireless Communication, 2004. Proceedings of the IEEE 6$^{th}$ Circuits and Systems Symposium on Shanghai, China, May 31-Jun. 2, 2004, Piscatawar, NJ, USA, IEEE, May 31, 2004 pp. 587-590, XP010716137 ISBN: 0-7803-7938-1.

Wubben D. et al., "Impulse shortening and equalization of frequency-selective MIMO channels with respect to layered space-time architectures" Signal Processing, Amsterdam, NL, vol. 83, No. 8, Aug. 3003 (Aug. 2003), pp. 1643-1659, XP004433469 ISSN: 0165-1684.

P. W. C. Chan and R. S. K. Cheng, "Optimal power allocation in zero-forcing MIMO-OFDM downlink with multiuser diversity, " in Proc. 14th IST Mobile & Wireless Communications Summit, Dresden, Germany, Jun. 2005.

Y. Zhang and K. Letaief, "An efficient resource- allocation scheme for spatial multiuser access in MIMO/OFDM Systems," IEEE Trans . on Communications, vol. 53, pp. 107-116, Jan. 2005.

F. M. Wilson and A. W. Jeffries, "Adaptive SDMA downlink beamforming for broadband wireless networks," in Proc. Wireless World Research Forum Meeting 14, San Diego, CA, Jul. 2005.

G. Del Galdo and M. Haardt, "Comparison of zero-forcing methods for downlink spatial multiplexing in realistic multi-user MIMO Channels," in Proc. IEEE Vehicular Technology Conference 2004—Spring, Milan, Italy, May 2004.

D. Bartolome, A. Pascual-Iserte, and A. I. Perez-Neira, "Spatial scheduling algorithms for wireless Systems," in Proc. IEEE International Conference on Acoustics, Speech, and Signal Processing (ICASSP) , Hong Kong, CN, May '03.

P. Svedman, S. Wilson, J. L. J. Cimini, and B. Ottersten, "A simplified opportunistic feedback and scheduling scheme for OFDM," in Proc. IEEE 59th Vehicular Technology Conference, VTC 2004—Spring , vol. 4, Duisburg, Germany, May 2004, pp. 1878-1882.

P. Viswanath, D. N. C. Tse, and R. Laroia, "Opportunistic beamforming using dumb antennas," IEEE Trans. Information Theory, vol. 48, pp. 1277-1294, Jun. 2002.

V. Stankovic and M. Haardt, "Multi-user MIMO downlink beamforming over correlated MIMO Channels," in Proc. International ITG/IEEE Workshop on Smart Antennas (WSAO5) , Duisburg, Germany, Apr. 2005.

T. Bonald, "A score-based opportunistic scheduler for fading radio Channels," in Proc. of The Fifth European Wireless Conference EW, Barcelona, Spain, Feb. 2004.

P. Svedman, S. Wilson, and B. Ottersten, "A QoS-aware proportional fair scheduler for opportunistic OFDM, " in Proc. IEEE 60th Vehicular Technology Conference, 2004. VTC2004—Fall, vol. 1, 2004, pp. 558-562.

Farhang-Boroujeny B. et al., Layering Techniques for Space-Time Communication in Multi-User Networks, Vehicular Technology Conference, Oct. 6, 2003, pp. 1339-1343, vol. 2, Piscataway, NJ.

Aste T. et al, Downlink Beamforming for Cellular Mobile Communications (GSM System), Annals of Telecommunications, Nov. 1998, pp. 435-448, vol. 53, No. 11/12, Paris, FR.

Anxin Li et al., A Novel Approach to Signal Detection in MIMO-OFDM Systems Combining Coding and Joint Detection Techniques, Emerging Technologies: Frontiers of Mobile and Wireless Communication, May 31, 2004, pp. 587-590, Piscataway, NJ.

Wubben D. et al., Impulse Shortening and Equalization of Frequency-Selective MIMO Channels with Respect to Layered Space-Time Architectures, Signal Processing, Aug. 2003, pp. 1643-1659, vol. 83, No. 8, Amsterdam, NL.

Office Action for Korean Application No. 10-2008-7008758, dated Feb. 23, 2010, 9 pgs.

Fuchs et al. "A Novel Tree-Based Scheduling Algorithm for the Downlink of Multi-User MIMO Systems with ZF Beamforming." IEEE International Conference on Acoustics, Speech and Signal Processing (ICASSP '05), Mar. 18-23, 2005, vol. 3, pp. III-1121 to III-1124.

Dinnis, A. K. and J. S. Thompson. "Investigation of Fairness Issues with Multiple Antennas in High Data Rate CDMA Systems." IEEE 59th Vehicular Technology Conference, May 17-19, 2004, vol. 2, pp. 723 to 727.

Stancovic, V. and M. Haardt. "Multi-User MIMO Downlink Beamforming over Correlated MIMO Channels." Proceedings International ITG/IEEE Workshop on Smart Antennas (WSA '05), Duisburg, Germany, Apr. 2005.

English Translation of German Office Action mailed Aug. 5, 2009, in DE Appl. No. 102005046911.6, filed Sep. 22, 2005, 5 pgs.

Fuchs-Lautensack, Martin. "Advances in Multi-User Scheduling and Turbo Equalization for Wireless MIMO Systems," Reports from the Communications Research Laboratory at Ilmenau University of Technology., Editor: Univ.-Prof. Dr.-Ing. Martin Haardt Ilmenau, Germany, 2008.

"Spatial Scheduling for SOMA," Ilmenau University of Technology Communications Research Laboratory, Presentation given at ICASSP 2005, Mar. 18, 2005.

English language translation of the Office Action for German patent application DE 10 2006 043 847.7-35, German Patent and Trademark Office, issued on Aug. 5, 2009.

English-Language Abstract for Japanese Patent Publication No. 2002-112328 A, published Apr. 12, 2002; 1 page.

English-Language Translation of Office Action directed to related Japanese Patent Application No. 2008-531716, mailed Jun. 7, 2011, from the Japanese Patent Office; 3 pages.

* cited by examiner

METHOD FOR SELECTION OF AN OPTIMIZED NUMBER OF SUBSCRIBERS IN MOBILE RADIO SYSTEMS

BACKGROUND

The invention concerns wireless communication systems with several antennas at a base station and one or more antennas at the receivers (Multiple Input Multiple Output System—MIMO). Use of several antennas makes it possible for the signals of different subscribers to be spatially distinguished during transmission or reception at the base station. Several subscribers can be served simultaneously by space division multiple access (SDMA) on this account, which significantly increases system throughput. At the same time, subscribers with several antennas can be supplied with more than one data stream as required (spatial multiplexing—SMux). For this purpose, the data streams can be sent, for example, in the strongest propagation directions of the transmission channel, the so-called spatial modes, so that they can be distinguished at the receiver. Different boundary conditions that lead to different mathematical SDMA transmission algorithms are conceivable. One boundary condition, for example, can be that the data streams sent to the individual subscribers should not interfere with each other.

SUMMARY

The object of the invention is the problem of selecting the subscribers to be served simultaneously, which occurs in all SDMA transmission algorithms, the invention being restricted to SDMA algorithms of the so-called class of vector modulation methods. The invention includes methods with strongly reduced complexity for selection of an optimized number of spatially poorly correlated subscribers, as well as computer programs, equipping a computer unit that executes the methods according to the invention, and also technical systems required to implement the methods.

BRIEF DESCRIPTION OF THE DRAWINGS/FIGURES

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

Figure 1:
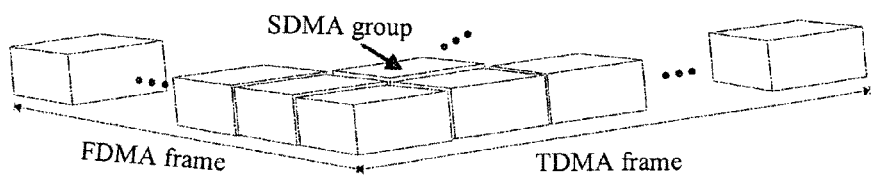
FIG. 1 depicts a grid of TDMA and FDMA frames for SDMA groups, according to an exemplary embodiment.

Consider a base station of a system in which SDMA with Time Division Multiple Access (TDMA) and Frequency Division Multiple Access (FDMA) and SMux can but need not necessarily be combined. The limited number of antennas at the base station limits the maximum number of subscribers that can be served simultaneously and requires expansions of the SDMA transmission algorithms, with which the subscribers can be efficiently divided into groups. This is due to the fact that the maximum number of subscribers that can be served efficiently in space at the same time is limited by the rank of the combined channel matrix. In each time or frequency slot, a different subset of subscribers can then be simultaneously served by SDMA.

Each SDMA transmission method requires an appropriate mechanism for selection of an appropriate subset of subscribers that can be served simultaneously by means of SDMA and each transmission station that is supposed to use Space Division Multiple Access must therefore be equipped with the technical means to implement an appropriate selection method.

So-called vector modulation methods that require and utilize knowledge of the transmission channel in any form are the basis of SDMA transmission methods. The data symbols to be transmitted, as explained in Section 6, are then multiplied by vectorial beam-forming weights that can be calculated with consideration of a variety of boundary conditions and have an effect on the emission characteristic of the antenna.

In selecting the subscribers that are to be simultaneously served by means of SDMA, the following fundamental problems (presented in simplified fashion) arise, whose solution is the task of the invention:

Grouping of subscribers with strongly spatially coordinated transmission channels must be avoided, since spatial distinguishability of subscribers by the SDMA transmission method would otherwise be hampered and data throughput would sharply decline. This is due to the fact that the quality of the effective transmission channel, after applying the SDMA transmission method, would be seriously compromised because of inefficient beam-forming weights, and that interference between data streams, which are to be sent to the different subscribers, would increasingly occur.

The group size must be optimized by the method, since this changes the possible division of available transmission power and therefore strongly influences data throughput.

Division of users should occur with simultaneous consideration of the two other dimensions, time and frequency, and should permit, as required, consideration of fairness and service quality requirements of these subscribers.

The cost for prior calculation of the anticipated channel quality, after applying the SDMA transmission method, must be reduced or avoided during selection of groups, since the result depends on the subscriber combination and the calculation complexity therefore could not be managed in realistic systems with several hundred subscribers.

The number of groups to be tested should be efficiently reduced without ruling out possibly promising combinations from the outset.

In reducing the complexity, the fact that the situation in the system only changes gradually should be exploited, so that independent decisions need not be made at each time.

In the case of SISO systems (Single Input, Single Output, i.e., only one antenna at the transmitter and receiver), a related problem is present, which, however, is adequately solved. It was already recognized there that by selecting subscribers with the best channels during each transmission and by appropriate division of transmitter resources, the total throughput of the system can be increased [DE 100 21 862] and one selects the subscribers, for example, with the objective of maximizing the rate. As an alternative, the subscribers can be chosen with the objective of limited delay or high service quality.

The previously described type of MIMO transmission systems, according to the present state, represents a very promising solution for future wireless communication systems. However, the problem of subscriber selection is not fully solved by many methods or only with very high calculation complexity. For example, [US 2005/147023] describes a similar problem in such a system, but provides no method with which the user groups, referred to there as "orthogonal sets", are to be identified, let alone their optimal size. Two basic types of solutions can be distinguished: one approach consists of formulating optimization of system throughput as a mathematical problem and finding a closed solution for the optimum, for example, [1]. Finally, by means of a selection method the subscriber subgroup that satisfies this optimum is sought. For this purpose, however, it is necessary to calculate beforehand the channel quality after applying the SDMA method by means of knowledge concerning the transmission channel, and specifically for all possible user combinations that are of interest in the search for the optimum—this type of approach therefore does not satisfy the fourth of the aforementioned conditions. In searching for the best subscriber combination, in most cases, an extensive search through all possible combinations is resorted to. However, this leads to an impracticably high calculation expense, especially if a quantity, like channel capacity, is used as characteristic during selection, which is based on the channel quality after application of beam-forming, and if this is explicitly calculated for each subscriber in each possible combination. All this applies to [WO 2005/053186], [WO 2002/033848], [EP 1 542 419] (in which [WO 2005/053186] is specified for application in the uplink). Although [EP 1 542 419], for example, could optimize the group size after calculation of the rate, a constant number of subscribers is also resorted to.

Iterative selection methods that are not directly based on system throughput, but on different metrics for correlation between channels of the subscribers or different types of defined indicators for channel quality after beam-forming, are also widespread. For example, the direction of arrival or angle of arrival of subscriber signals is used [2] [3] [EP 0 926 912] [U.S. Pat. No. 6,895,258] [US 2004/087343], or a correlation factor between subspaces of two channel matrices is defined [4] [5] [WO 98/30047] [EP 1 434 452]. ([US 2004/087343] does not separate the subscribers by different frequencies or times, but by assigning orthogonal codes to strongly interfering subscribers.) These metrics, however, have no direct reference to system throughput and therefore do not permit formal optimization of the optimal SDMA group size (see also second requirement). Instead, a group size is empirically established, which is not formally connected directly to the system throughput to be achieved, for example, the maximum possible number of subscribers. A stipulated group size is used, for example, in [EP 1 505 741] without stating how this is to be determined. Or a threshold value for the permitted spatial correlation of two subscribers is empirically determined and a possible group size derived from this. [EP 1 434 452] additionally resorts to a correlation dimension, determined from received signals at the data rate required by the subscribers, and initially selects subscribers with a low rate, since they generate less interference, and specifically until the number of subscribers again does not surpass a more closely defined threshold value. The invention [WO 2005/055507] can be viewed as related to the present invention. It does not directly operate with system throughput either, but with arbitrary sorting sizes that are based on the correlation matrix of the channel matrix after applying the SDMA transmission method. However, the design of the sorting sizes of [WO 2005/055507], as in the present invention, makes it possible to optimize the number of simultaneously active connections. A difference relative to the present invention is that all methods of [WO 2005/055507] are restricted to SDMA transmission methods with so-called matrix modulation and are not discussed for the class of vector modulation methods considered here. Section 6 will take up the difference between matrix and vector modulation.

Solutions in which the subscribers themselves send back a measured or calculated characteristic for their channel quality to the base station exist as a second subgroup [6] [EP 1 505 741], by means of which the base station selects the subscribers. However, these are only of interest for SDMA methods that utilize no channel knowledge at the transmitter and, for example, randomly select their beam-forming vectors [7]. If channel knowledge at the transmitter is present anyway, in order to operate the SDMA method, the additional data load should be dispensed with by feedback of information for grouping and instead, as in the present invention, the channel quality efficiently estimated beforehand after beam-forming. The invention [WO 98/30047], for example, which is conceived for the uplink, also uses a form of prediction, but the measurable channel coefficients are predicted without using beam-forming. Only a selection of subscribers with strong channels is possible on this account. To allow for the problem of poor separability of subscribers with spatially correlated channels [WO 98/30047] again resorts to a correlation dimension, which entails the already mentioned problem of undefined group size (see above).

The invention uses a cost-effective estimation of the subscriber rates to be expected after beam-forming as sorting metric, as well as a tree-like sorting algorithm to test subscriber combinations. Because of this subscriber combinations need not be ruled out from the outset. The cost for pre-calculation of the beam-forming vectors for all combinations to be tested is avoided, but without ignoring the effect of subscribers on each other in the same group. This is possible by means of a new interpretation of the zero-forcing boundary condition (no interference permitted between the data sent to different subscribers), using orthogonal projection matrices. Zero-forcing can be viewed as a limit case of all other SDMA methods, which is sought for high signal-to-noise ratios. It is therefore readily suited to summarize the effect of correlation in a characteristic without having to calculate interference.

Use of the rate estimate presented in this invention simultaneously permits calculation of an estimate of the best group size during the search for the best subscriber combination, without having the complexity, however, of pre-calculation of the exact rate. In the base version, the objective is maximization of the total rate of the system. As an expansion, methods already known from the literature for considering service quality requirements and fairness can be combined with the rate estimation, as explained briefly below.

Formulas and numbers are italicized in the subsequent text. Symbols for vectors and matrices are also bolded.

FIG. 1 to FIG. 4 are also referred to for explanation. In each execution of the algorithm, the best subgroup is to be found from a set of K mobile subscribers, based on the circumstances of the mobile radio channels, which can then be simultaneously served by SDMA. The point of departure is a system in which SDMA is combined with TDMA and FDMA. The resource elements in the time direction are orthogonal to each other, and it can also generally be assumed that the carriers of the FDMA system can also be viewed as orthogonal. The resource elements in the frequency direction can consist of several carriers. This works, if the channels of the carriers are strongly coherent and the same subscriber grouping can be applied to them without noticeable loss. A grid, as schematically depicted in FIG. 1, is obtained. For each coordinate pair in time (n)- and frequency direction (f), an SDMA group with size G (n, f) is sought. In the interest in simplicity, the time and frequency indices are generally left out below. In the most general case, a new decision is made for each frequency coordinate and therefore one instance of the method executed. If one assumes that new channel information is only available once for the SDMA method in a TDMA frame, it therefore follows that the groupings can remain unchanged in the time direction, if they depend only on the channel knowledge and not on the requirements of the subscribers, as in the base version of the method.

In each resource element, the channel is viewed as frequency-nonselective. The generally complex data symbols that are to be sent to subscribers g∈ ℕ, $1 \leq g \leq G$, are summarized in a column vector $d_g$. The number of symbols cannot be greater than the rank of the channel matrix $H_g$, which contains the complex transmission coefficients between the $M_{R,g}$ receiving antennas of the subscriber g and the $M_T$ transmitting antennas. Each transmission symbol is multiplied by a generally complex weight vector. Hence the term vector modulation. The weight vectors can be collected as columns in a matrix $M_g$. Another type of modulation is matrix modulation, in which the symbols are arranged in a matrix, one dimension of which corresponds to space and the other dimension to another orthogonal resource, like time. The symbols at the receiver g can be collected in the vector $y_g \in \mathbb{C} M_{R,g} \times 1$ and generally read $$Y_g = H_g M_g d_g + \sum_{j=1, j \neq g}^{G} H_g M_j d_j + n_g.$$

Figure 2:
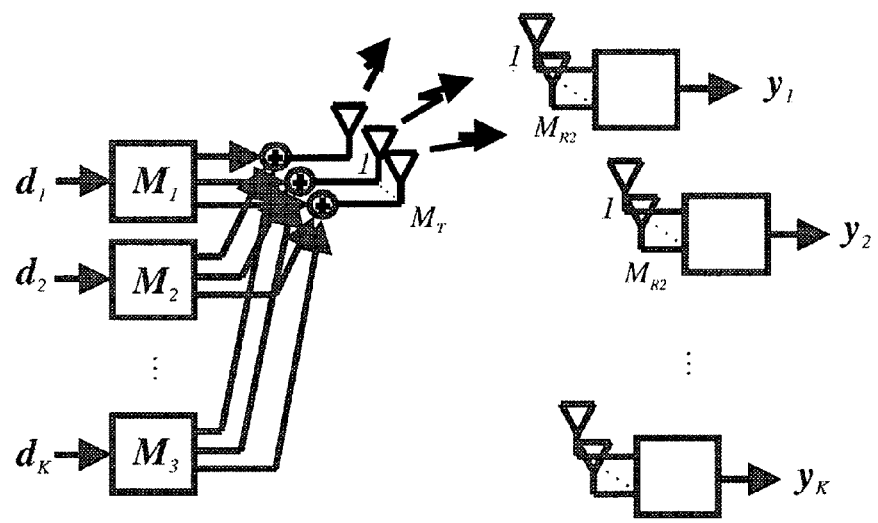
FIG. 2 depicts a SDMA system model, according to an exemplary embodiment.
Figure 3:
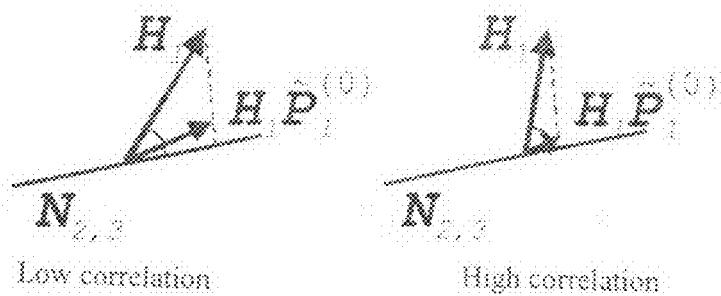
FIG. 3 depicts correlation between channel of subscribers according to an exemplary embodiment.

This system model is schematically depicted in FIG. 2. The column vector $n_g$, according to this model, contains scanning values of independent white Gaussian-distributed noise processes for each receiving antenna, in which each element is supposed to have the total power $\sigma_n^2$, referred to the total frequency band.

Most vector modulation methods strive for situations with low noise, so that no interference is to be generated between the data sent to the individual subscribers (zero-forcing methods). In this invention, subscriber selection is conducted under the assumption that this boundary condition is sought. Because of this, the method can carry out a subscriber selection without having to be adapted to the corresponding transmission method.

In order for the ZF boundary condition to be satisfied, the modulation matrix $M_g$ of a subscriber must lie in the section of the null space of the channel matrices of all other subscribers. The sum term in the receiving vector would then equal zero. This can be achieved by conducting as first step in setting up a modulation matrix for subscriber g an orthogonal projection of channel $H_g$ into the null space of a matrix $$\tilde{H}_g = [H_1^T \ldots H_{g-1}^T H_{g+1}^T \ldots H_G^T]^T$$

which contains all channel matrices of all other subscribers in the same group. All subsequent steps in generating the modulation matrix can be calculated based on a new channel $$H_g \tilde{P}_g^{(0)}$$

instead of the measured channel $H_g$. $\tilde{P}_g^{(0)}$ is then an orthogonal projection matrix into the null space of matrix $\tilde{H}_g$. The present invention operates with the quality of the projected channel $H_g \tilde{P}_g^{(0)}$. This reflects the quality loss that is produced by strong spatial correlation between subscriber g and all other subscribers in the same group. The stronger the channel of subscriber g is correlated with the channels of all other subscribers, the greater the angle between its signal space and the section of the null spaces of all other subscribers, see FIG. 3. The orthogonal projection in this case generates a new channel with very small norm, which must be avoided. The presented case corresponds to a system with the 3×3 channel matrix and receivers, each with one antenna, as well as real-value channel matrices, since otherwise such a graphic representation would be impossible. The inverse case with smaller spatial correlation is also shown. All subsequent steps in calculating the modulation matrix play a subordinate role in the problem of spatial correlation, for which reason they are ignored in this invention. Calculation of the modulation matrices during subscriber selection therefore drops out.

It was formulated as a requirement on the method that the calculation complexity in selecting the optimized number of subscribers is to be reduced. During use of the quality of $H_g \tilde{P}_g^{(0)}$ as quality criterion, the problem arises that, during testing of different group compositions, the projection for each subscriber must be fully recalculated in each possible combination. To solve the problem, the following known decoupling approximation can be used:

$$\tilde{P}_g^{(0)} = (P_1^{(0)} \cdot \ldots \cdot P_{g-1}^{(0)} \cdot P_{g+1}^{(0)} \cdot \ldots \cdot P_G^{(0)})^p, p \in \mathbb{N},$$
$$p \to \infty.$$

The projection matrix for subscriber g into the common subspace of all other subscribers can be approximated by a product from the projection matrices $P_g^{(0)}$ into the individual null spaces of all other subscribers. p is then the projection order, for which p=1 is already sufficiently accurate in practice. The sequence of multiplication is not relevant, as long as equal $P_g^{(0)}$ are not repeatedly multiplied.

This approximation has the advantage that only once at the beginning of subscriber selection must the K projection matrices into the null spaces of all K subscribers in the system be calculated and stored. All required combinations can then be generated during selection by multiplication.

Calculation of $P_g^{(0)}$ can occur by means of a singular value decomposition (SVD) $H_g = U_g \Sigma_g V_g^H$. If the first $r_g = \text{ran}\{H_g\}$ columns of $V_g$ are denoted $V_g^{(1)}$, then $P_g^{(0)} = I - V_g^{(1)} V_g^{(1)H}$. For further complexity reduction, rank 1 approximations of $V_g^{(1)}$ can be used to calculate $P_g^{(0)}$.

To make optimization of the group size possible, the thing to do is to operate with the squared Frobenius norm $\|H_g \tilde{P}_g^{(0)}\|_F^2$ and link this with the transmission power and noise power, always using the above projection approximation. Since calculation of the modulation matrices is to be dispensed with in the base version of this invention during subscriber selection, uniform division of the entire transmission power $P_T$ to all N resource elements in the frequency direction and there to all modes of all assigned subscribers is assumed.

One possible sorting metric $\eta_g$ (for a resource element) can be defined as a lower estimate of the data rate $C_{ZF,g}$ to be expected of a subscriber with number g in a subscriber group of size G, given the ZF boundary condition under the aforementioned assumptions as follows:

$$\eta_g = \log_2\left(1 + \frac{P_T}{Gr_g \sigma_n^2} \|H_g \tilde{P}_g^{(0)}\|_F^2\right).$$

$\sigma_n^2$ is then the noise power in the entire frequency band and therefore $\sigma_n^2/N$ is the noise power in the actual resource element. The number of resource elements in the frequency direction N is reduced by the assumption of uniform division of transmission power.

Calculation of a Sorting Metric by Means of Average Channel Statistics in Time—or Frequency Direction If the channel changes too quickly and the measurement for the SDMA method becomes too imprecise, averaging in the time direction (expectation value formation) is generally resorted to by forming an estimate of the spatial correlation matrix $R_{T,g}=E\{H_g^H H_g\}$ on the transmitter side. The present invention can therefore be used with the method according to [8]. The projected channel $H_g \tilde{P}_g^{(0)}$ is then calculated with a reconstructed channel matrix $\hat{H}_g$ instead of $H_g$. This can be obtained by singular value decomposition as follows:

$$R_{T,g}=U_g \Sigma_g U_g^H = U_g \Sigma_g [U_g^{(1)} U_g^{(0)}] \text{ and therefore}$$

$$\hat{H}_g = \Sigma_g^{1/2} U_g^{(1)H}$$

in which $U_g^{(1)}$ includes the first $r_g$ columns of $U_g$.

The same method can also be used, if a resource element in the frequency direction consists of several coherent carriers. The sorting metric for a resource element can then be calculated by means of channel knowledge of the carriers in the resource element averaged in the frequency direction.

Expansion to a Fair Sorting Metric with Rate Stipulations

Since the sorting metric $\eta_g$ is an estimate of a data rate, in principle, any rate-based method can be combined with the invention to include subscriber stipulations and fairness. A method that is known to experts in this field is implementation in proportional fairness is considered particularly relevant. For this purpose, the rates (in this case the sorting metric) for each subscriber are normalized to a long-term average of its past rates. An increase in the product of the rates of all subscribers in the system is achieved in the long-term. Different references concerning this subject can be found, for example, in [9]. Since the proportional metric changes with each resource assignment, subscriber selection should occur, if possible, in each time slot instead of at the beginning of each TDMA frame.

Proportional fairness is particularly relevant, since, by normalizing the metric to its average, possible sharp differences in path attenuation of subscribers can be compensated and therefore subscribers distant from the base station can also acquire a high metric. Rate stipulations can be incorporated by normalizing the sorting metric to the objective, if the sorting metric represents a rate estimate. An additive or multiplicative cost factor for the individual required services of the user can also be introduced and linked to the sorting metric, as done with the data rate, for example, in [10].

Description of a Tree-Like Sorting Algorithm

The algorithm described in this section serves to reduce the number of subscriber combinations to be tested. It operates by means of a sorting metric, as presented in the previous section, which includes the effect of spatial components, but is not restricted to them.

The algorithm operates initially independently in each time slot t and subcarrier f and there seeks the best subset of K subscribers in the system. Farther below, we discuss an expansion that can process all subcarriers together. As already mentioned, subscriber selection can remain unchanged in a TDMA frame, if it is based merely on channel knowledge and not on proportional fairness. In this case, the algorithm need only be executed at the beginning of the frame and t can be considered as frame number.

The algorithm operates in two phases:

In the first phase, favorable subscriber subsets are determined in all possible group sizes G between G=1 and the maximum group size supported by the SDMA method. The selection criterion for the subsets can then be maximization of the metric sum of the subsets. Their maximum size is generally determined by the maximum possible rank of the combined channel matrix $H=[H_1^T \ldots H_G^T]$ of the subgroup.

Figure 4:
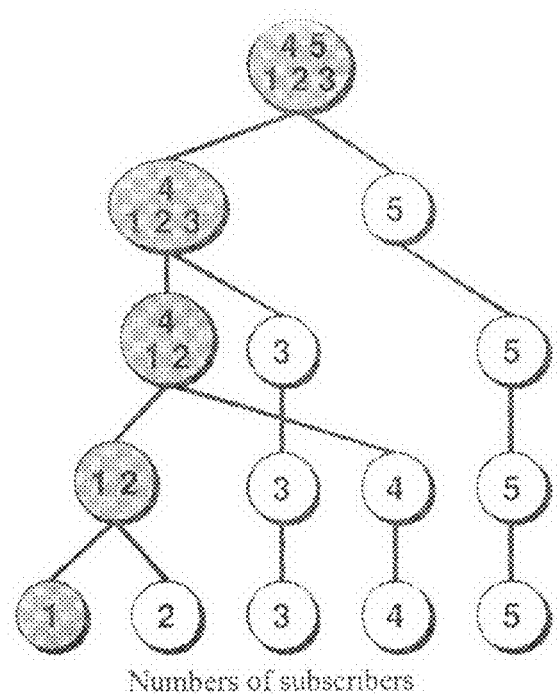
FIG. 4 depicts a search tree according to an exemplary embodiment.

Selection can occur by means of a search tree, as presented in FIG. 4 on the example for K=5. If one rises in the tree, the subscriber with the best metric is initially sought and is assigned the number one. In the next steps, all combinations from the group are tested with subscriber one and each of the other subscribers. The combination that has the maximum sum metric, for example, is retained and appears on the left edge. This is continued, until the maximum permitted group size is reached and said favorable subscriber subset is obtained on the left edge of the tree.

In the second phase, the algorithm selects a subset for use from the favorable subsets on the left edge of the tree and implicitly establishes the group size in so doing. This selection can occur again by means of the aforementioned sorting metric. In order to achieve higher accuracy, or if the selected metric is not connected to the rate, the exactly calculated rate of the subscriber can be resorted to in this phase.

Traceability of Search Algorithm and Integration of New Users

In a real system, the conditions change continuously, for example, by movements of subscribers and changes in environment. This can be utilized, in order to reduce the cost for subscriber selection, by making new decisions based on the past. For this purpose, for example, it is possible not to repeat the entire sorting method at each time in the above algorithm. Instead, only some possible combinations are considered, starting from the previously optimal solution, and the change in group size limited to a small number, for example, to one tree level. For example, one can go a level higher and then two levels downward, in order to also update the previous solution. In order to go downward one tree level, a procedure similar to that described above can be used, in which all groups that form, if only one subscriber is removed, are tested. The complexity drops sharply by this tracking.

New subscribers can be simply added as candidates in one tree level. Subscribers that have left the system are removed from the previous solution before it is updated.

Simultaneous Treatment of all Frequency Resources

In the case of OFDM as transmission technique, the carriers are orthogonal to each other. Because of this, the grouping decisions are initially viewed independently of each other. However, if the final selection is to be made from the found favorable groups not with a sorting metric, but based on the calculated SDMA rate after beam-forming, a three-dimensional problem develops: certain beam-forming methods achieve the maximum rate only by common space-frequency-power loading, for example, the water-filling solution. In a multicarrier system with N subcarriers (or N resource elements, consisting of several carriers), in which the carriers can be viewed as orthogonal, the grouping problem can be reduced to a virtual system with only one carrier. For this purpose, a new system is formed with KN virtual users from all K subscriber channels of all carriers. A search algorithm can then be applied to this virtual system with f=1. However, subscribers who originate from different subcarriers must then be viewed as not present during calculation of the subscriber metrics, if they are in the same group. This procedure reduces the number of groupings to be tested significantly, if time tracking of the solution is used simultaneously.

The type of solution of the present invention satisfies all the requirements formulated in Section 3 on a grouping method and the discussed special embodiments also have the following advantages (see Section 6 Embodiment for Detailed Explanations):

It is applicable, both for MIMO and MISO (Single Output) systems and systems with different number of antennas at the different receivers.

The invention was originally developed for SDMA methods that do not permit interference between subscriber data—so-called zero-forcing (ZF) methods. However, it can also be used without change in methods that permit residual interference, since the ZF case is contained as optimal limit case in each other method, which is sought at a high signal-to-noise power ratio.

There is no restriction to a certain type of receiver algorithm.

The number of participants may be changed arbitrarily during the operation. New participants are considered during the next execution of the search tree. Subscribers can also arbitrarily be removed from the search tree.

No feedback of additional characteristics from subscribers to the base station is required, in order to be able to carry out special grouping. Instead the already available channel knowledge at the transmitter is utilized.

The method can also use long-term average knowledge of channel statistics instead of perfect knowledge of the MIMO channel, if the channel deviates too strongly or perfect measurements cannot be conducted.

Since the users are selected by means of an estimated rate, rate-based methods already available in the literature can be combined with the method to treat fairness and service quality requirements (see above).

REFERENCES

[1] P. W. C. Chan and R. S. K. Cheng, "Optimal power allocation in zero-forcing MIMO-OFDM downlink with multiuser diversity," in *Proc. 14th ITS Mobile & Wireless Communications Summit*, Dresden, Germany, June 2005.

[2] Y. Zhang and K. Letaief, "An efficient resource-allocation scheme for spatial multiuser access in MIMO/OFDM systems," *IEEE Trans. on Communications*, vol. 53, pp. 107-116, January 2005.

[3] F. M. Wilson and A. W. Jeffries, "Adaptive SDMA downlink beamforming for broadband wireless networks," in *Proc. Wireless World Research Forum Meeting* 14, San Diego, Calif., July 2005.

[4] G. Del Galdo and M. Haardt, "Comparison of zero-forcing methods for downlink spatial multiplexing in realistic multi-user MIMO channels," in *Proc. IEEE Vehicular Technology Conference* 2004-Spring, Milan, Italy, May 2004.

[5] D. Bartolomne, A. Pascual-Iserte, and A. T. Perez-Neira, "Spatial scheduling algorithms for wireless systems," in *Proc. IEEE International Conference on Acoustics, Speech, and Signal Processing (ICASSP)*, Hong Kong, China, May 2003.

[6] P. Svedman, S. Wilson, J. L. J. Cimini, and B. Ottersten, "A simplified opportunistic feedback and scheduling scheme for OFDM," in *Proc. IEEE 59th Vehicular Technology Conference, VTC* 2004-Spring, vol. 4, Duisburg, Germany, May 2004, pp. 1878 1882.

[7] P. Viswanath, D. N. C. Tse, and R. Laroia, "Opportunistic beamforming using dumb antennas," *IEEE Trans. Information Theory*, vol. 48, pp. 1277-1294, June 2002.

[8] V. Stankovric and M. Haardt, "Multi-user MIMO downlink beamforming over correlated MIMO channels," in *Proc. International ITG/IEEE Workshop on Smart Antennas (WSA05)*, Duisburg, Germany, April 2005.

[9] T. Bonald, "A score-based opportunistic scheduler for fading radio channels," in *Proc. of The Fifth European Wireless Conference EW*, Barcelona, Spain, February 2004.

[10] P. Svedman, S. Wilson, and B. Ottersten, "A QoS-aware proportional fair scheduler for opportunistic OFDM," in *Proc. IEEE 60th Vehicular Technology Conference,* 2004. *VTC2004-Fall*, vol. 1, 2004, pp. 558-562.

The invention claimed is:

1. A method, comprising:
   determining, using a base station, sorting metrics for subscriber devices based on carrier channel characteristics for carrier channels of a wireless communication system;
   producing, using the base station, groups of the subscriber devices subject to a zero-forcing boundary condition, wherein a first one of the produced groups includes one of the subscriber devices having a maximum one of the sorting metrics and a last one of the produced groups includes a maximum number of the subscriber devices that successfully operate with respect to the subscriber device having the maximum sorting metric, wherein during testing of different subscriber group combinations, a non-iterative, closed-form formula is used to approximate a projection matrix for each subscriber device by calculating the product of the projection matrices of all other subscriber devices; and
   determining, using the base station, one of the produced groups of the subscriber devices to operate during a transmission period of the wireless communication system,
   wherein the wireless communication system uses space-division multiple access in combination with at least one additional orthogonal multiple access method, the at least one additional orthogonal multiple access method comprises frequency division multiple access, and the determining the sorting metrics, the producing the groups, and the determining the one of the groups are performed independently for each frequency channel of the frequency division multiple access.

2. The method of claim 1, wherein the producing is based on a tree-like algorithm.

3. The method of claim 1, wherein the determining the sorting metrics comprises:
   determining average statistics of the carrier channel characteristics for the carrier channels.

4. The method of claim 1, wherein the determining the sorting metrics comprises:
   normalizing the sorting metrics to a predetermined data rate.

5. The method of claim 1, wherein the determining the sorting metrics comprises:
   determining an estimate of a subscriber device data rate.

6. The method of claim 5, wherein the determining the sorting metrics is based on transmission power of radio frequency energy of the base station and noise power in the carrier channels.

7. The method of claim 1, wherein the producing is based on maximizing a total of the sorting metrics of each of the groups of the subscriber devices.

8. The method of claim 1, wherein the wireless communication system comprises one of a Multi-Input Single-Output system and a Multi-Input Multi-Output system.

9. The method of claim 8, wherein the wireless communication system is a Multi-Input Multi-Output system and respective ones of the subscriber devices have different number of antennas.

10. The method of claim 1, further comprising:
determining whether any of the subscriber devices disconnected from the wireless communication system;
determining whether a new subscriber device connected to the wireless communication system;
updating the groups of the subscriber; and
determining one of the updated groups of the subscriber devices to operate during the transmission period of the wireless communication system.

11. The method of claim 1, further comprising:
coupling multiple antennas to the base station; and
using the space-division multiple access for the wireless communication system.

12. The method of claim 1, wherein the at least one additional orthogonal multiple access method further comprises time division multiple access.

13. The method of claim 12, wherein:
time in the time division multiple access is divided into time slots; and
the determining the one of the groups occurs at each time slot.

14. The method of claim 12, wherein:
time in the time division multiple access is divided into time slots and a plurality of the time slots are grouped together to form time frames; and
the determining the one of the groups occurs at each time frame.

15. The method of claim 11, wherein the determining the sorting metrics further comprises:
determining a channel matrix $H_g$ for a subscriber device g with coefficients of the carrier channel characteristics between the multiple antennas of the base station and the subscriber device g in a group of G subscriber devices;
determining a matrix of channel matrices $\tilde{H}_g = [H_1^T \ldots H_{g-1}^T H_{g+1}^T \ldots H_G^T]^T$ of the subscriber devices in the group not including the channel matrix of the subscriber device g; and
determining a matrix $\tilde{P}_g^{(0)}$, an orthogonal projection of the channel matrix $H_g$ into a null space of the matrix $\tilde{H}_g$.

16. The method of claim 15, wherein the determining the sorting metrics further comprises:
determining an approximation matrix
$\tilde{P}_g^{(0)} = (P_1^{(0)} \cdot \ldots \cdot P_{g-1}^{(0)} \cdot P_{g+1}^{(0)} \cdot \ldots \cdot P_G^{(0)})^p$ wherein p is a positive natural number and wherein $P_i^{(0)}$ is a projection of the channel matrix $H_g$ in a null space of a channel matrix of a subscriber device i in the group of G receivers.

17. The method of claim 16, wherein p is configured to be 1.

18. The method of claim 15, further comprising:
determining a correlation matrix $R_{T,g} = E\{H_g^H H_g\}$; and
determining an approximation channel matrix $\hat{H}_g$ from the correlation matrix to be used instead of the channel matrix $H_g$.

19. A wireless communication system, comprising:
subscriber devices; and
a base station, configured to:
determine sorting metrics for the subscriber devices based on carrier channel characteristics for carrier channels of the wireless communication system,
produce groups of the subscriber devices subject to a zero-forcing boundary condition, wherein a first one of the produced groups includes one of the subscriber devices having a maximum one of the sorting metrics and a last one of the produced groups includes a maximum number of the subscriber devices that successfully operate with respect to the subscriber device having the maximum sorting metric, wherein during testing of different subscriber group combinations, a non-iterative, closed-form formula is used to approximate a projection matrix for each subscriber device by calculating the product of the projection matrices of all other subscriber devices; and
determine one of the produced groups of the subscriber devices to operate during a transmission period of the wireless communication system,
wherein the wireless communication system uses space-division multiple access in combination with at least one additional orthogonal multiple access method, the at least one additional orthogonal multiple access method comprises frequency division multiple access, and the determining the sorting metrics, the producing the groups, and the determining the one of the groups are performed independently for each frequency channel of the frequency division multiple access.

20. A non-transitory computer-readable medium having stored thereon computer-executable instructions execution of which by a computing device, cause the computing device to perform a method comprising:
determining, using a base station, sorting metrics for subscriber devices based on carrier channel characteristics for carrier channels of a wireless communication system;
producing, using the base station, groups of the subscriber devices subject to a zero-forcing boundary condition, wherein a first one of the produced groups includes one of the subscriber devices having a maximum one of the sorting metrics and a last one of the produced groups includes a maximum number of the subscriber devices that successfully operate with respect to the subscriber device having the maximum sorting metric, wherein during testing of different subscriber group combinations, a non-iterative, closed-form formula is used to approximate a projection matrix for each subscriber device by calculating the product of the projection matrices of all other subscriber devices; and
determining, using the base station, one of the produced groups of the subscriber devices to operate during a transmission period of the wireless communication system,
wherein the wireless communication system uses space-division multiple access in combination with at least one additional orthogonal multiple access method, the at least one additional orthogonal multiple access method comprises frequency division multiple access, and the determining the sorting metrics, the producing the groups, and the determining the one of the groups are performed independently for each frequency channel of the frequency division multiple access.

21. A system, comprising:
means for determining sorting metrics for subscriber devices based on carrier channel characteristics for carrier channels of a wireless communication system;
means for producing groups of the subscriber devices subject to a zero-forcing boundary condition, wherein a first one of the produced groups includes one of the subscriber devices having a maximum one of the sorting metrics and a last one of the produced groups includes a maximum number of the subscriber devices that successfully operate with respect to the subscriber device having the maximum sorting metric, wherein during testing of different subscriber group combinations, a non-iterative, closed-form formula is used to approximate a projection matrix for each subscriber device by calculating the product of the projection matrices of all other subscriber devices; and means for determining one of the produced groups of the subscriber devices to operate during a transmission period of the wireless communication system, wherein the wireless communication system uses space-division multiple access in combination with at least one additional orthogonal multiple access method, the at least one additional orthogonal multiple access method comprises frequency division multiple access, and the determining the sorting metrics, the producing the groups, and the determining the one of the groups are performed independently for each frequency channel of the frequency division multiple access.

\* \* \* \* \*

UNITED STATES PATENT AND TRADEMARK OFFICE
CERTIFICATE OF CORRECTION

PATENT NO.       : 8,498,193 B2
APPLICATION NO.  : 11/991735
DATED            : July 30, 2013
INVENTOR(S)      : Haardt et al.

It is certified that error appears in the above-identified patent and that said Letters Patent is hereby corrected as shown below:

On the title page, item (56), under "OTHER PUBLICATIONS", in Column 1, Lines 1-5, delete "Martin Fuchs, "A Novel Tree-Based Scheduling Algorithm for the Downlink of Multi-user MIMO Systems with ZF Beamforming." IEEE International Conference on Acoustics, Speech and Signal Processing (ICASSP '05), Mar. 18-23, 2005, vol. 3, pp. III-1121 to III-1124.".

On title page 2, item (56), under "OTHER PUBLICATIONS", in Column 1, Lines 1-4, delete "Farhang-Boroujeny "Layering Techniques for space-time communication in multi-user networks" Vehicular Technology Conference, 2003. VTC 2003--Fall. 2003 IEEE 58th Orlando, FL, USA Oct. 6-9, 2003, pp. 1339-1343, vol. 2.".

On title page 2, item (56), under "OTHER PUBLICATIONS", in Column 1, Line 20, delete "Piscatawar," and insert -- Piscataway, --, therefor.

On title page 2, item (56), under "OTHER PUBLICATIONS", in Column 1, Lines 23-26, delete "Wubben D. et al., "Impulse shortening and equalization of frequency-selective MIMO channels with respect to layered space-time architectures" Signal Processing, Amsterdam, NL, vol. 83, No. 8, Aug. 3003 (Aug. 2003), pp. 1643-1659, XP004433469 ISSN: 0165-1684.".

On title page 2, item (56), under "OTHER PUBLICATIONS", in Column 2, Line 10, delete "(WSAO5) ," and insert -- (WSA '05), --, therefor.

On title page 2, item (56), under "OTHER PUBLICATIONS", in Column 2, Lines 19-21, delete "Farhang-Boroujeny B. et al., Layering Techniques for Space-Time Communication in Multi-User Networks, Vehicular Technology Conference, Oct. 6, 2003, pp. 1339-1343, vol. 2, Piscataway, NJ.".

On title page 2, item (56), under "OTHER PUBLICATIONS", in Column 2, Lines 22-24, delete "Aste T. et al, Downlink Beamforming for Cellular Mobile Communications (GSM System), Annals of Telecommunications, Nov. 1998, pp. 435-448, vol. 53, No. 11/12, Paris, FR.".

Signed and Sealed this
Twenty-seventh Day of May, 2014

Michelle K. Lee
*Deputy Director of the United States Patent and Trademark Office*

CERTIFICATE OF CORRECTION (continued)
U.S. Pat. No. 8,498,193 B2

On title page 2, item (56), under "OTHER PUBLICATIONS", in Column 2, Lines 25-28, delete "Anxin Li et al., A Novel Approach to Signal Detection in MIMO-OFDM Systems Combining Coding and Joint Detection Techniques, Emerging Technologies: Frontiers of Mobile and Wireless Communication, May 31, 2004, pp. 587-590, Piscataway, NJ.".

On title page 2, item (56), under "OTHER PUBLICATIONS", in Column 2, Line 44, delete "Stancovic," and insert -- Stankovic, --, therefor.

On title page 2, item (56), under "OTHER PUBLICATIONS", in Column 2, Line 52, delete "IImenau" and insert -- Ilmenau --, therefor.

On title page 2, item (56), under "OTHER PUBLICATIONS", in Column 2, Line 53, delete "IImenau," and insert -- Ilmenau, --, therefor.

On title page 2, item (56), under "OTHER PUBLICATIONS", in Column 2, Line 55, delete "IImenau" and insert -- Ilmenau --, therefor.

In the Specification

In Column 9, Line 38, delete "ITS" and insert -- IST --, therefor.

In Column 9, Line 53, delete "Bartolomne," and insert -- Bartolome, --, therefor.

In Column 9, Line 53, delete "A. T." and insert -- A. I. --, therefor.

In Column 9, Line 66, delete "Stankovric" and insert -- Stankovic --, therefor.